United States Patent [19]
Holben et al.

[11] 3,834,417
[45] Sept. 10, 1974

[54] COUPLING UNIT FOR FLUID CONTROL COMPONENTS

[75] Inventors: Clair Dean Holben, Littleton; John J. Humphrey, Denver, both of Colo.

[73] Assignee: C. A. Norgren Co., Littleton, Colo.

[22] Filed: Apr. 10, 1972

[21] Appl. No.: 242,381

[52] U.S. Cl. ............... 137/613, 137/608, 137/269, 285/12, 285/177
[51] Int. Cl. ............................................. F17d 1/00
[58] Field of Search .......... 137/613, 608, 271, 270, 137/269, 625, 454.2, 454.6; 285/137 R, 161, 12, 177; 251/367

[56] References Cited
UNITED STATES PATENTS

| | | | |
|---|---|---|---|
| 1,074,493 | 9/1913 | Cross et al. | 137/613 X |
| 1,169,003 | 1/1916 | Burkhardt | 137/613 X |
| 1,208,480 | 12/1916 | Casey | 137/613 X |
| 1,307,194 | 6/1919 | Follick | 137/613 X |
| 1,347,833 | 7/1920 | Bakley | 137/613 |
| 1,831,855 | 11/1931 | Fullman | 285/177 X |
| 3,117,587 | 1/1964 | Willinger | 137/271 X |
| 3,317,003 | 5/1967 | Lukas | 137/269 X |
| 3,348,570 | 10/1967 | Nealy | 137/454.6 X |
| 3,477,469 | 11/1969 | Paley | 137/270 X |
| 3,709,248 | 1/1973 | Aurich et al. | 137/271 |

FOREIGN PATENTS OR APPLICATIONS

| | | | |
|---|---|---|---|
| 721,998 | 11/1965 | Canada | 137/608 |

*Primary Examiner*—William R. Cline
*Assistant Examiner*—Ira S. Lazarus
*Attorney, Agent, or Firm*—Sheridan, Ross & Fields

[57] ABSTRACT

A coupling unit is provided for removably connecting a fluid control component in a fluid supply line. The coupling unit includes a member for supporting at least one such component and includes an aperture through which the component extends and in which it is held in fluid-tight relationsip with the inlet and outlet thereof being in communication with passageways extending from the aperture to an inlet and outlet of the member for connection in a fluid line. In one embodiment the member is provided with a plurality of apertures in fluid communication for receiving fluid control components, such as a valve, a filter, a regulator and a lubricator connected in series. The inlet and outlet ends of the coupling unit can be made to removably receive threaded inserts provided with different thread types so that the coupling unit can be attached to fluid lines having different threads. In a further embodiment the unit comprises a yoke having two opposed open-ended portions in fluid communication and one or more mating elements which are attachable to one or both of the open-ended portions of the yoke to form an aperture through which a fluid control component can extend. If desired, the side walls of the apertures may be tapered to facilitate positioning the fluid control component having a similarly tapered body. The portion of the aperture adjacent the ports may be formed as flats which cooperate with a similar flat on the fluid control component so that one flat engages a seal on the other flat to form a fluid tight juncture.

14 Claims, 9 Drawing Figures

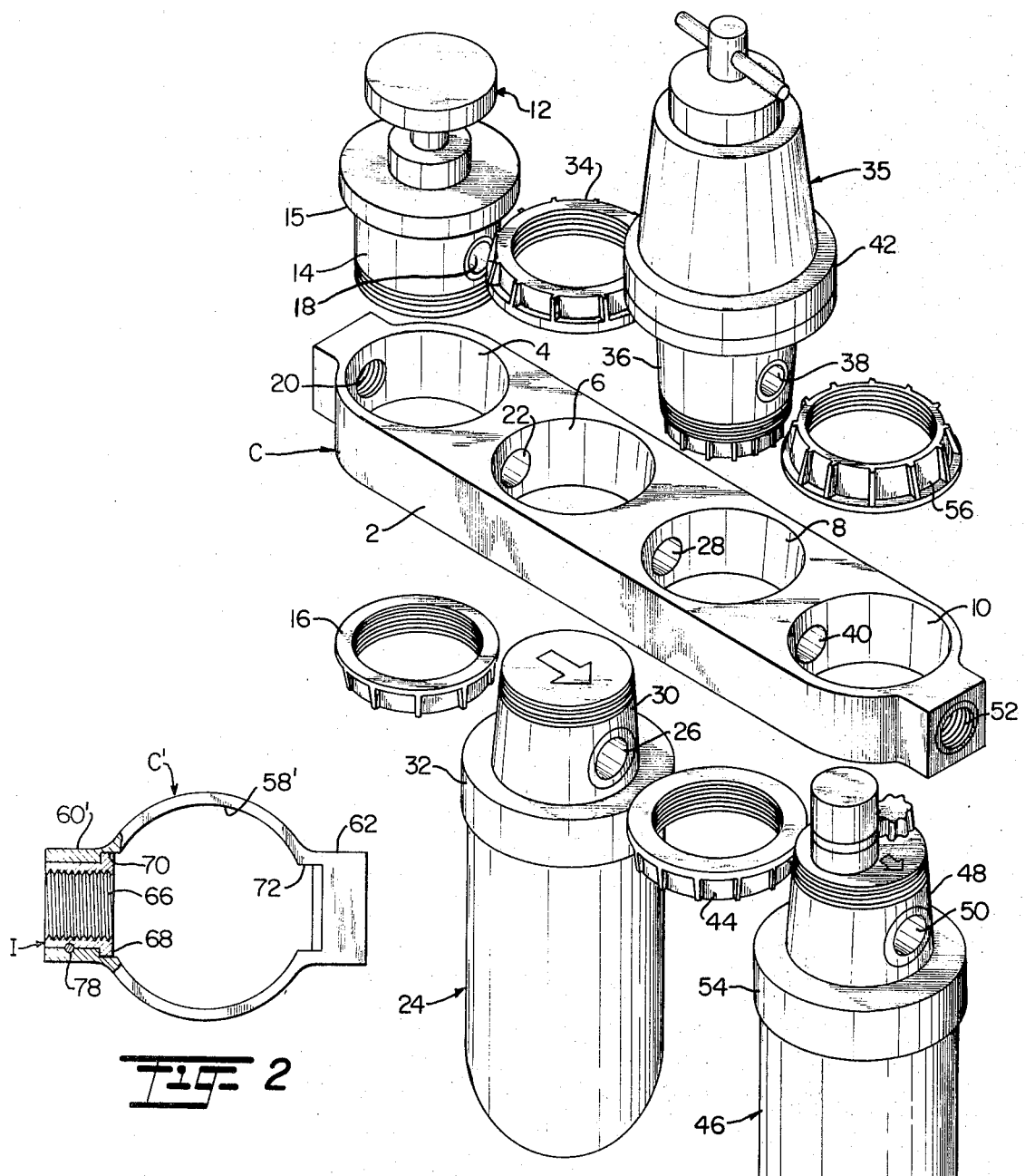
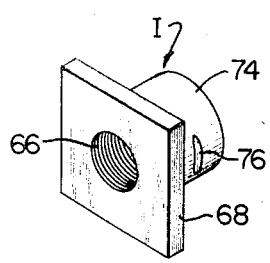

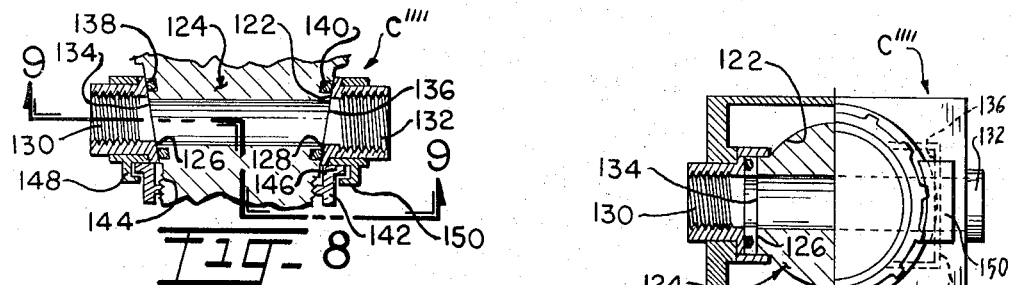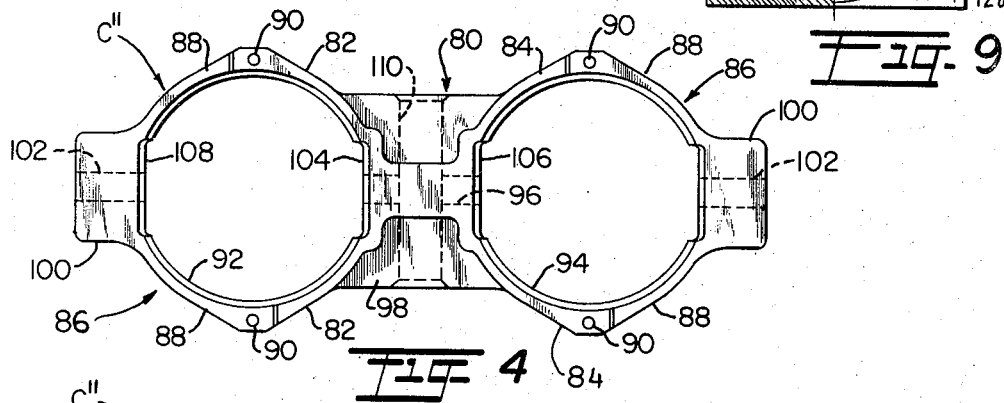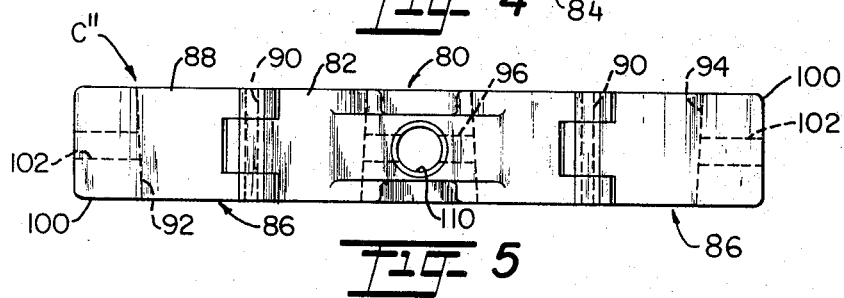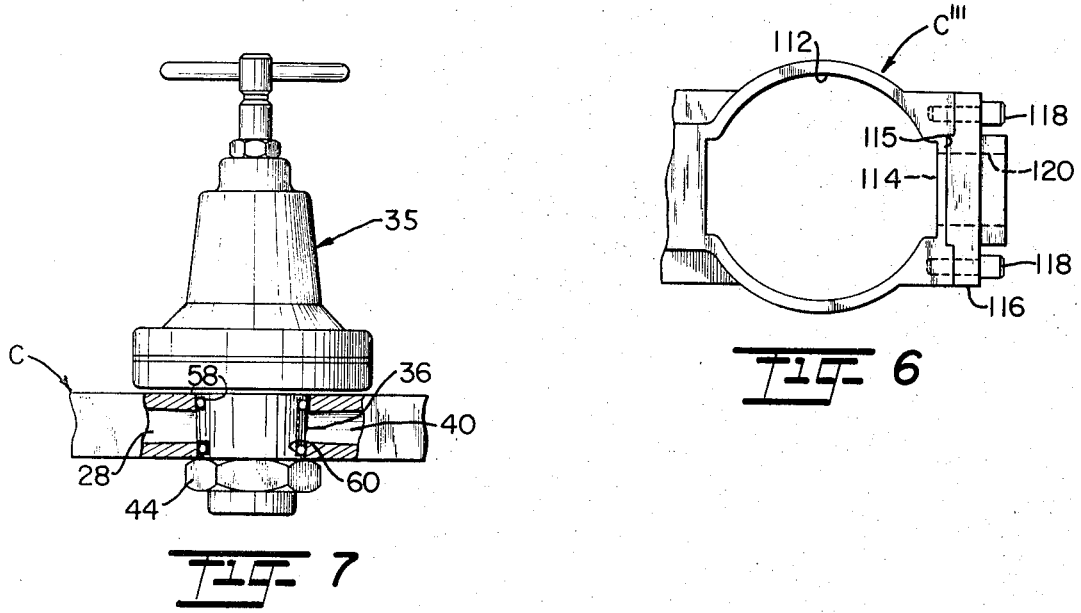

COUPLING UNIT FOR FLUID CONTROL COMPONENTS

BACKGROUND OF THE INVENTION

1. Field of the Invention

This invention relates to a coupling unit for fluid control components and more specifically to a coupling unit in which fluid control elements are easily replaced without extended down time.

2. Description of the Prior Art

In fluid lines it is often necessary to provide various fluid control components, such as valves, filters, regulators and lubricators which may be used single or in many different combinations. The task of interconnecting these units within a fluid line can be time consuming since normally it is necessary to interconnect each unit with the next unit by means of a pipe which must be threaded into a coupling on the individual units and properly tightened and sealed to prevent leakage between the units. In actual practice, it may be difficult to assure that no leakage occurs and if a fluid control component becomes faulty and must be replaced, substantial down time and considerable expense in the form of labor costs to effect the replacement can be incurred.

One attempt to solve this problem is disclosed in U. S. Pat. application Ser. No. 180,037 entitled "Fluid Control and Conditioning Units for Insertion in Fluid Lines" by Peter J. Pass et al., filed Sept. 13, 1971. In this unit fluid control components are provided which have planar faces adjacent inlet and outlet ports thereof and are adapted to mate with coupling means also having planar external faces in fluid-tight relationship and are held together by means of bolts extending longitudinally through the coupling means and the various units. Although this arrangement is satisfactory, it involves the use of many different parts and in order to replace one fluid control component all fluid control components must be substantially removed from the fluid line to make a replacement.

SUMMARY OF THE INVENTION

In accordance with this invention a coupling unit for removably connecting a fluid control component having an inlet and an outlet in a fluid supply line is provided. This coupling unit comprises a member for supporting at least one fluid control component in an aperture through which a portion of a component extends. The coupling unit also includes a first and second passageway extending through the supporting member transversely to the aperture in communication therewith and each having an end for connecting one end of the assembly to a fluid line, the component being positionable within the aperture so that the inlet thereof is in fluid communication with one of the passageways and the outlet thereof is in fluid communication with the other of the passageways.

More specifically, in one embodiment the coupling unit includes a plurality of apertures through the supporting member for respectively receiving a body of a fluid control component and has fluid flow means interconnecting the apertures. Conveniently, a shoulder of each fluid control unit abuts one side of the support member and a flange or collar is threaded over the end of the sleeve and abuts the other side of the support member to hold the respective components in fluid-tight relationship with the supporting member. Advantageously, any one of the units can be separately removed and replaced or repaired without having to disassemble or remove the other fluid control components in the line.

In another embodiment, a coupling unit is provided which comprises a yoke section having two generally open-ended portions facing away from each other and interconnected by a neck which has a passageway extending from one portion to the other. A mating portion is connectable to either of the open-ended portions to form one of the apertures. With these two elements a coupling unit of any length and including any number of apertures can be built up. Conveniently, these sections may be interconnected by pins extending transversely interengaging ends of the open-ended portions and the mating portions.

With respect to any of the embodiments, the walls of the apertures may be tapered and the body portion of the fluid control elements extending through the apertures may be similarly tapered to facilitate assembly and to properly position each element. Also, the portion of the apertures adjacent the inlet and outlet ports may form a flat to receive a seal. If desired, the flat at one side of a component can be larger than the flat at the other side of the component to be received in similar sized flats in the coupling unit so that the component can only be keyed or put into coupling unit one way.

It is also contemplated that the inlet and outlet may be provided with a removable insert having threads which may be of any one of several different thread types to permit attachment of the coupling unit to a fluid line having threads of any one of these types.

Additional advantages of this invention will become apparent from the description which follows, taken in conjunction with the accompanying drawings.

DESCRIPTION OF THE DRAWINGS

FIG. 1 is an exploded perspective view showing one embodiment of the coupling unit together with fluid control components useable therewith;

FIG. 2 is a top plan view of an alternative embodiment, with parts in section for clarity of illustration, showing an insert positioned in a single apertured component;

FIG. 3 is a perspective view of the insert of FIG. 2;

FIG. 4 is a further alternative embodiment showing a coupling unit comprising an open-ended yoke and two mating sections;

FIG. 5 is a side elevation of the embodiment of FIG. 4;

FIG. 6 is a fragmentary top plan view of a fluid control component having a detachable insert;

FIG. 7 is a vertical section through one aperture of the coupling unit of FIG. 1 showing a fluid control component, such as a regulator, positioned therein;

FIG. 8 is a vertical section showing a still further alternative embodiment of the invention; and FIG. 9 is an offset section taken along line 9-9 of FIG. 8 showing further details of the invention.

DESCRIPTION OF THE PREFERRED EMBODIMENTS

In accordance with this invention, a coupling unit C, as shown in FIG. 1, includes a support member 2 having apertures 4, 6, 8 and 10 extending therethrough, as shown. Conveniently, fluid control components can be inserted in the apertures. As illustrated, a shut-off valve 12 is provided with a portion 14 which is adapted to extend through aperture 4 so that a shoulder 15 thereon abuts one side of support member 2. The valve is held in place by a threaded flange 16 which is engageable with the opposite side of supporting member 2. Shut-off valve 12 is provided with an inlet and an outlet, such as outlet 18, which are respectively adapted to align the threaded inlet 20 and a passageway 22 extending between aperture 4 and aperture 6. Thus, fluid introduced through inlet 20 from a fluid supply line (not shown) will pass through inlet valve 12 and through passageway 22 to filter 24 which is positioned in aperture 6 with its inlet aligned with passageway 22 and its outlet 26 aligned with passageway 28 which interconnects aperture 6 and aperture 8. As with shut-off valve 12, filter 24 includes a body portion 30 and a shoulder 32 that abuts the bottom side of supporting member 2 and a threaded flange 34 is receivable over the end of body portion 30 and engages the top side of supporting member 2 to hold the filter in position within the coupling unit C.

Similarly, a regulator 35 has an inlet in a body portion 36 which is alignable with passageway 28 in aperture 8 and an outlet 38 alignable with a passageway 40 between apertures 8 and 10. The regulator has a shoulder 42 which is engageable with the upper surface of supporting member 2 and a threaded flange 44 which engages the threads on the bottom of body portion 36 to hold the regulator in coupling unit C.

A lubricator 46 has a body portion 48 which is receivable in aperture 10 so that the inlet therein aligns with passageway 40 and the outlet 50 aligns with a threaded outlet 52 in support member 2. The lubricator has a shoulder 54 which engages the bottom of supporting member 2 and a threaded flange 56 which engages the threads on the end of sleeve 48 to hold lubricator 46 in position in coupling unit C.

As best seen in FIGS. 1 and 7, each of the units may have a tapered body portion such as body portion 36 of regulator 35 which is received in a similarly tapered aperture such as aperture 8 in support member 2 to facilitate positioning of each control unit in its respective aperture. In addition, to provide a fluid-tight seal, a pair of spaced O-rings are provided on each sleeve, such as O-rings 58 and 60 in coupling unit C as shown in FIG. 7.

Conveniently, inserts having different thread types may be removably received in the inlet and outlet of a coupling unit such as coupling unit C' of FIG. 2 which has a single aperture 58'. A fluid supply line can be connected to the inlet 60' and outlet 62 to provide communication with aperture 58 which is adapted to receive a fluid control component. A removable insert I is provided which is illustrated as having internal threads 66 of any suitable thread type and has a peripheral flange 68 which is received in either recess 70 adjacent inlet 60 or recess 72 adjacent outlet 62 to provide flats for sealing engagement with a similar flat on the component. The cylindrical sleeve 74 of insert I is provided with a relief or notch 76 and, if desired, a similar recess or notch can be provided in the internal wall of both inlet 60 and outlet 62 for receiving a pin 78 which removably holds the insert in either the inlet or the outlet opening. It will be apparent that any of the coupling units, such as coupling unit C, can be constructed to removably receive insert I to permit the unit to be used with a fluid line having pipe threads of any type. Furthermore, the sleeve 74 can be extended to project beyond the ends of inlet 60 and outlet 62 so that external threads can be provided for engagement with internal threads of a fluid supply line.

A further alternative coupling unit C", as shown in FIG. 4, includes a central yoke 80 having open-ended portions 82 and 84 each forming one half of an aperture for receiving a fluid control component. The ends of open-ended portions 82 and 84 are each adapted to receive a mating section 86 having lugs 88 engageable with the ends of open-ended portions 82 and 84 and attached thereto as by transverse pins 90 to respectively form apertures 92 and 94. The two apertures are interconnected, as by a passageway 96 extending through neck 98 which joins the two apertures and forms the center of the yoke 80. Each mating section 86 is provided with neck 100 having a passageway 102 therethrough which serves as either an inlet or an outlet when the unit is placed in a fluid line. In addition, the yoke is provided with flats 104 and 106 at opposite ends of passageway 96 and sections 86 are provided with a flat 108 adjacent passageway 102. These flats are adapted to engage corresponding flats on the fluid control components received therein to provide a surface for receiving a sealing member, such as an O-ring, not shown, than would be provided by a curved surface. It can readily be seen that with the two components, namely yoke 80 and mating sections 86, a coupling unit can be provided having any number of apertures desired. For example, two mating sections 86 may be connected with each other to form a single apertured coupling unit. By using a single yoke and two mating sections as shown in FIG. 4 a two apertured coupling unit may be provided. If two yokes are attached end to end and mating sections 86 attached to a opposite end of each yoke a three apertured coupling unit will be provided, and so on.

Advantageously, a transverse port 110 extends through neck 98 and is in communication with passageway 96 to provide a dishcarge port or a place to attach a pressure gauge to measure fluid pressure at this point. When such a pressure measurement is not necessary, the end of port 110 are plugged.

A further alternative coupling unit C''' is shown in FIG. 6 which includes at least one aperture 112 having a passageway 114 having a recess 115 for receiving an insert 116 which attached, as by bolts 118 and has threads along a passageway 120 which may be of any thread type so that the coupling unit C''' can be used in a fluid supply line whose threads are of any type.

A still further alternative embodiment is shown in FIGS. 8 and 9 wherein a coupling unit C'''' is provided which has a tapered aperture 122 for receiving a fluid control component 124 therein as shown. Conveniently, aperture 122 is provided with opposed flats 126 and 128 adjacent ports 130 and 132 respectively. It will be noted that the coupling unit is constructed so that flat 128 is wider than flat 126, the flats being adapted to receive respectively flat sealing surfaces 134 and 136 of fluid control component 124 as shown. Thus, because of the difference in the size of the flats, the fluid control component is keyed so that it can only be inserted in a coupling unit in one way.

The fluid control component is sealed against ports 130 and 132 by O-rings 138 and 140, respectively, as shown in FIG. 8 and is held in this position by a ring 142 which receives threads 144 on the component. Conveniently, ring 142 is held in place by means of a flange 146 thereon which engages a pair of opposed lips 148 and 150. Thus, when it is desired to remove fluid control component 124 from coupling unit C'''' ring 142 can be rotated in the appropriate direction causing flange 146 to bear against lips 148 and 150, pushing component 124 upwardly and out of aperture 122, as by a screw action. In addition, the ring will not fall from the fluid control component if removed. If desired, the ring 142 may be made of a resilient plastic so that it can be squeezed inwardly to disengage flange 146 from lips 148 and 150 to remove the ring from the coupling unit when such removal is desired.

From the foregoing, it can be seen that a coupling unit comprising any of the embodiments disclosed has been provided which provides a quick and easy means of removing and replacing fluid control components from the fluid line without disturbing the line. By using such a coupling unit the components can be replaced very quickly with unskilled labor. A fluid control component is provided with a body portion which is slidable through the aperture until a shoulder thereon abuts one side of a supporting member of the coupling unit and the other end is held in place by a threaded flange which engages the end of the body portion to hold the fluid control component within the supporting member. By interconnecting the apertures with ports or passageways fluid can flow from the supply line through the coupling unit and each of the fluid control elements therein and out an outlet at the opposite end. If desired, the body portions and the respective apertures can be tapered to position the components in the control unit and flats can be provided at the inlet and outlet of the component which are of different sizes to key the component so that it can be inserted in a coupling unit having similar sized flats only one way. Furthermore, the coupling unit may include removable inserts in the inlet and outlet so that the thread size and type can be changed to accommodate a variety of fluid supplies.

The invention has been described in detail with particular reference to preferred embodiments thereto, but it will be understood that variations and modifications can be effected within the spirit and scope of the invention.

What is claimed is:

1. An assembly comprising a fluid control and/or conditioning component having an inlet in fluid communication with an outlet and a coupling unit for removably connecting said fluid component in a fluid supply line wherein the fluid component is mounted in said coupling unit with its inlet and outlet in a fixed position within said coupling unit, said coupling unit having a member for supporting at least one of the components;

means defining at least one aperture in said supporting member through which a portion of a component is extendable so that the inlet and outlet are located in a fixed predetermined position within the aperture;

means defining a first passageway extending through said supporting member transversely to said aperture in communication therewith and having an end for connecting one end of said assembly to the fluid line;

means defining a second passageway extending through said supporting member transversely to said aperture in communication therewith and having means for connecting the other end of said coupling unit to the fluid line;

said fluid component being removably positioned in a fixed non-rotatable predetermined position within said aperture so that the inlet thereof is always in fluid communication and axial alignment with one of said passageways within said coupling unit and the outlet thereof is always in fluid communication and axial alignment with the other of said passageways within said coupling unit; and means for holding said component in said fixed position within said aperture defining means.

2. An assembly, as claimed in claim 1, wherein said component has a threaded body portion extending through said aperture, said unit further including:

a flange threadably received on said body portion to hold said component in said aperture; and a pair of spaced lips on said supporting member for holding said flange adjacent said aperture during removal of said component so that upon turning said flange in a direction to remove said component, the threads thereof tend to force said component out of said aperture.

3. An assembly, as claimed in claim 1, wherein:

said aperture defining means defines a plurality of apertures each capable of receiving a fluid control component so that the inlet and outlet of each is in a predetermined fixed position with respect to said coupling unit; and fluid flow means interconnecting said apertures to provide fluid flow from the output of one component in one of said apertures to the inlet of another component in an adjacent aperture.

4. An assembly as claimed in claim 3, said aperture defining means further comprising:

a yoke section having two open-ended portions facing away from each other and interconnected by a neck having said fluid flow means extending from one portion to the other portion; and a first mating section connectable to either of said open-ended portions to form one of said apertures.

5. An assembly, as claimed in claim 4, further comprising:

a second mating section connectable to the other of said open-ended portions to form another of said apertures, said fluid flow means interconnecting said apertures.

6. An assembly, as claimed in claim 4, wherein said yoke section and said first open-ended section both include:

interengaging ends having openings which are alignable with each other; and a locking pin extendable through said aligned openings of each pair of interengaging ends to interconnect said yoke section and said semi-circular section.

7. An assembly, as claimed in claim 1, wherein the fluid control component has flat surfaces adjacent the inlet and outlet thereof and said aperture defining means includes:

flats adjacent said passageways to provide surfaces for engagement by the flat surfaces on the fluid control component; and a seal mounted in one of each pair of engageable flats to form a fluid-tight juncture between said passageways and the respective inlet and outlet.

8. An assembly, as claimed in claim 1, wherein:

said aperture defining means and said fluid component includes cooperating keying means which permits positioning of the fluid control component within the aperture defining means in only one way.

9. An assembly, as claimed in claim 9, wherein:

said keying means includes flats on opposite sides of said aperture which are of different size and are adapted to receive corresponding sized flats on the fluid control component so that the component can only be received one way.

10. An assembly, as claimed in claim 1, further comprising:

means defining a recess in at least one of said ends of said passageways for receiving any one of a plurality of inserts having different thread types for connection to different thread types on fluid lines.

11. An assembly, as claimed in claim 11, further comprising:

means defining a notch extending transversely across one edge of said recess for cooperating with a similar notch in an insert to form a keyway to receive a pin for locking the insert in said recess.

12. An assembly, as claimed in claim 12, further comprising:

an insert receivable in said recess having threads for connecting said manifold assembly to a fluid line and having a notch cooperating with said notch in said recess to form said keyway; and a pin receivable in said keyway to removably lock said insert in said recess.

13. An assembly as claimed in claim 1, further comprising:

means defining a recess in at least one of said ends of said passageways for receiving any one of a plurality of threaded inserts having the same external diameter but having different threads for connection to different threads on fluid lines; and bolt means extending through said insert and into said supporting member to attach said insert to said member in fluid tight relationship.

14. An assembly, as defined in claim 1, wherein said holding means includes cooperating flats on said aperture defining means and said fluid control component.

* * * * *